United States Patent Office 3,432,992
Patented Mar. 18, 1969

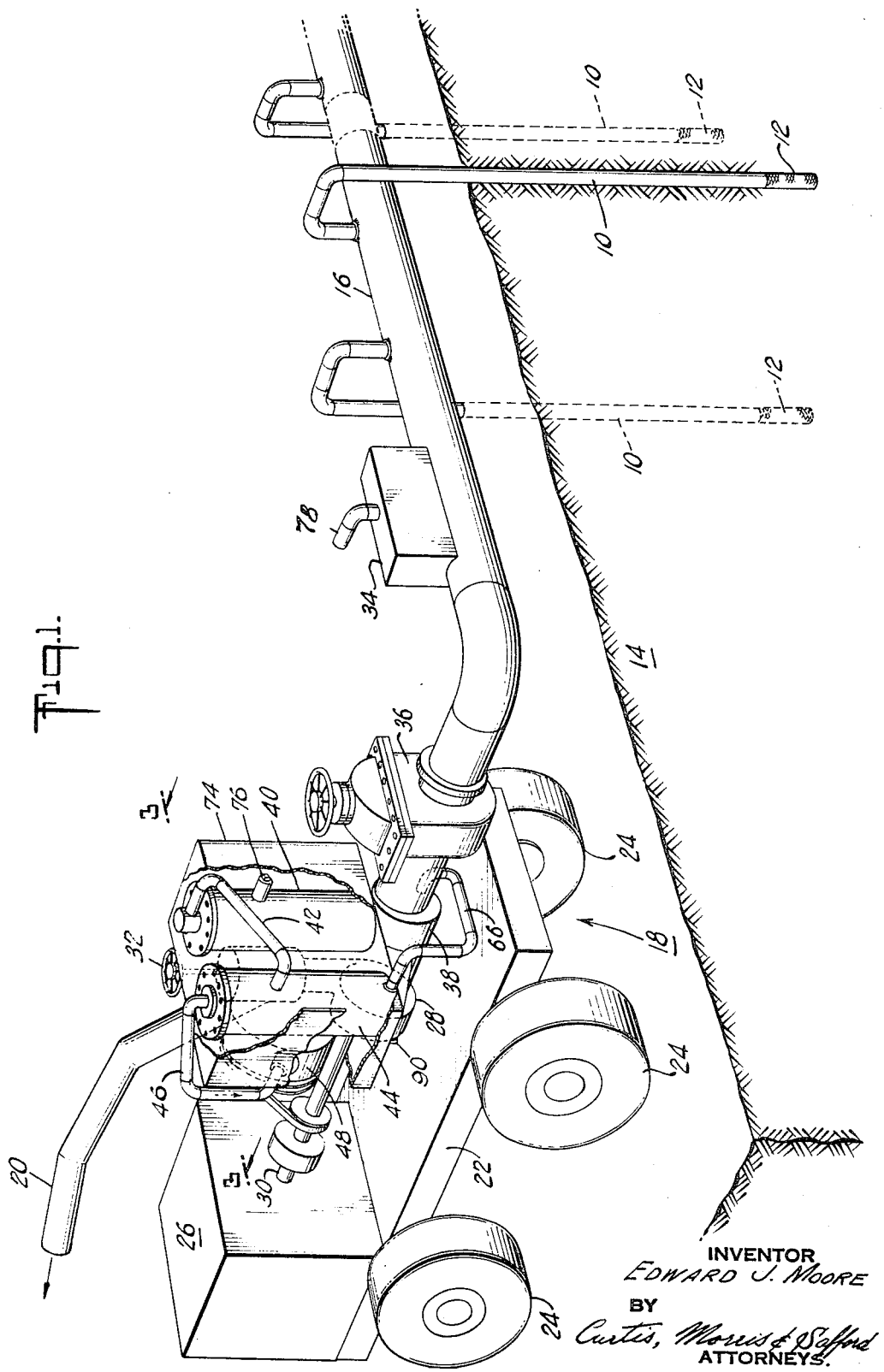

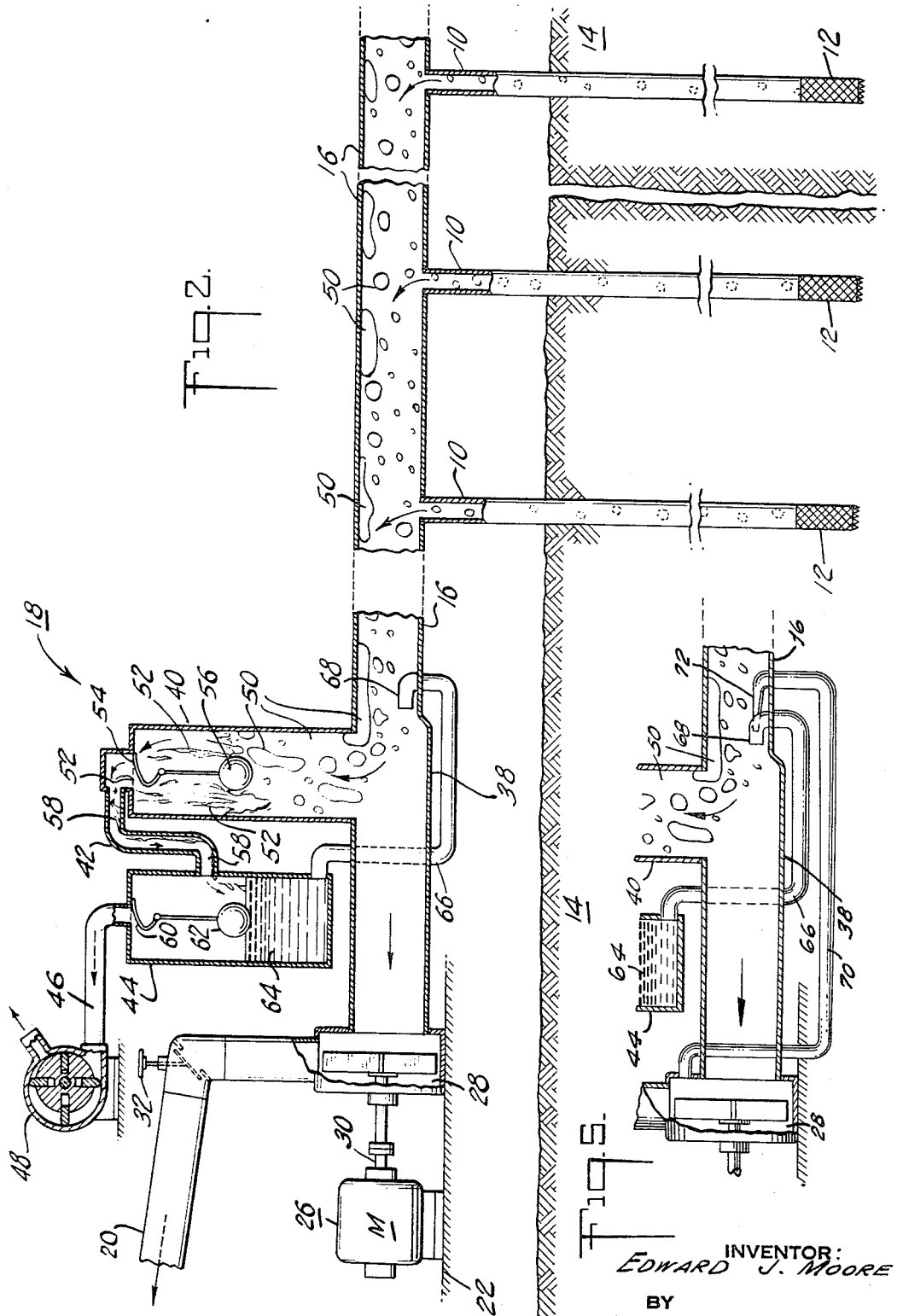

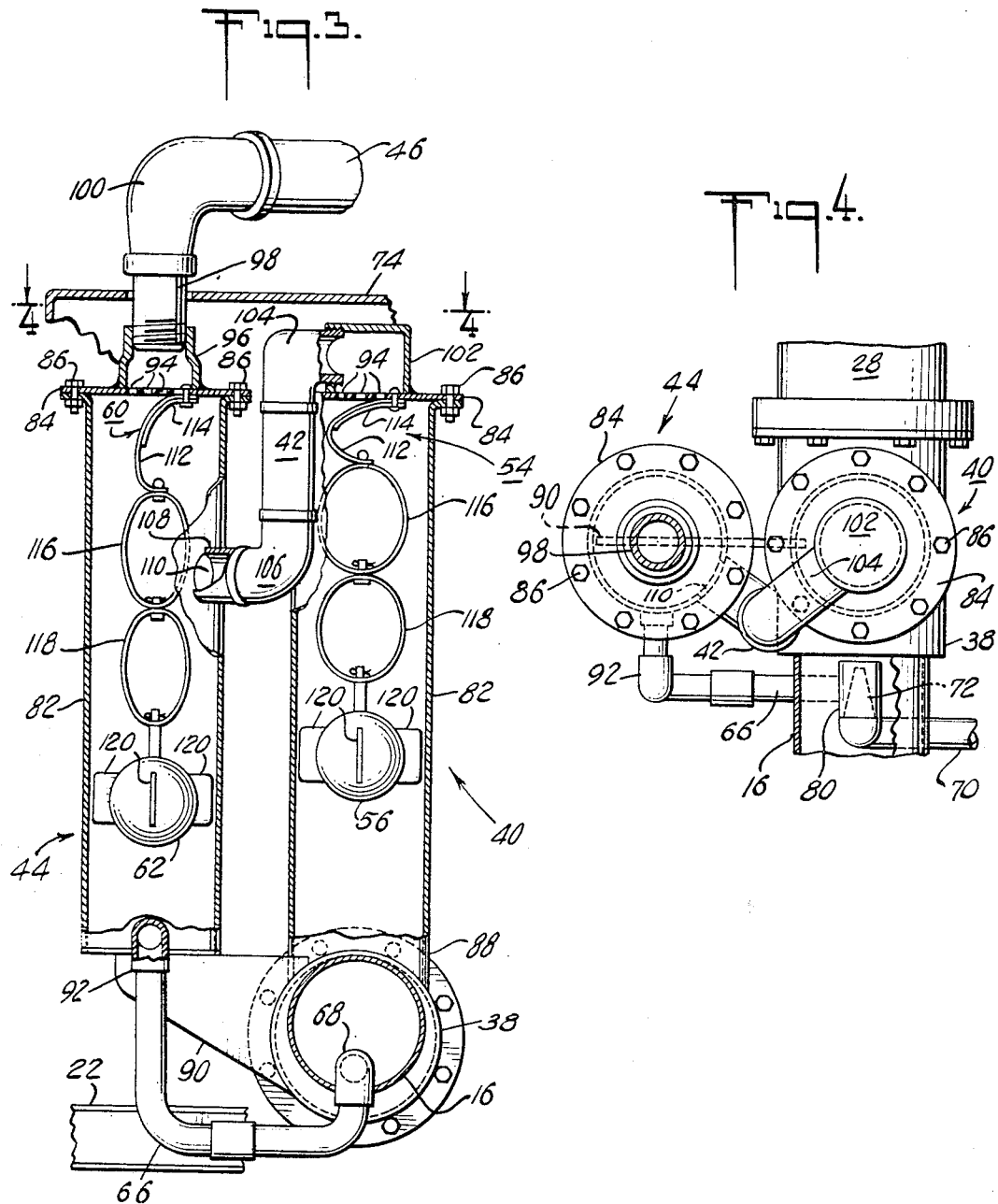

3,432,992
METHOD AND APPARATUS FOR REMOVING DISPERSED LIQUIDS FROM THE GROUND
Edward J. Moore, Morris Township, N.J., assignor to Moretrench Corporation, Rockaway, N.J.
Filed Oct. 14, 1966, Ser. No. 586,862
U.S. Cl. 55—51                         4 Claims
Int. Cl. B01d 19/00

ABSTRACT OF THE DISCLOSURE

Well-point system with liquid pumping unit having dual chambers connected in series to one another and a gas evacuation pump connected to the chambers for separating gases from liquids being pumped from the ground. The first chamber receives gases directly from the liquid and passes them to the second chamber. The gas evacuation pump is connected to the second chamber. Since liquid collected in the second chamber is quiescent, water is not readily splashed into the vacuum line leading to the evacuation pump. This prevents damage to the evacuation pump. A drain system is provided for automatically returning any water collected in the second chamber back to the main body of water being pumped.

---

This invention relates to apparatus for removing dispersed liquids from the ground; more particularly, this invention relates to a system for removing water from the ground over a substantial area by means of a series of pipes or "well-points" sunk into the ground at spaced intervals, and including a pumping unit for drawing the water out of the ground through the well-points.

A major problem found in the use of prior well-point equipment is caused by the fact that the water pumped by the system usually contains rather substantial quantities of air or other gases, and often contains substantial quantities of sand and other foreign particles. The liquid pump in the pumping unit of a well-point system usually is a centrifugal pump. Such pumps suffer a great loss of efficiency when there is any substantial quantity of gas in the liquid being pumped. Hence, in most well-point installations, it is necessary to remove the gas from the liquid in order for the pump to operate at a relatively high efficiency or, in some cases, in order for the pump to operate at all.

One device used to remove gases from the liquid is a separation chamber and vacuum pump. The usual separation chamber is a vertical tank whose bottom opens directly into the top of the pipe-line leading into the centrifugal pump. A vacuum pump is connected to the top of the chamber to evacuate gas separated from the liquid.

A very long-standing problem with such a separation system is caused by the fact that the liquid in the separation chamber bubbles violently and splashes upwardly with great turbulence as the gas is separated from it, and tends to get into the vacuum pump. Although reciprocating vacuum pumps are not seriously affected by the liquid, it is desired to use rotary vacuum pumps because of their considerably better performance at a lower cost. However, rotary vacuum pumps can be damaged or ruined if liquid from the well-points is allowed to get into them, especially if the liquid is ground water which carries particles of sand or other foreign matter.

Various systems have been proposed for preventing water carry-over into vacuum pumps. However, such systems, generally have been unsatisfactory. Accordingly, it is an object of the present invention to provide apparatus for continuously removing dispersed liquids from the ground in which gases are removed from the liquid by means of a separation chamber and a vacuum pump without the liquid being carried into the vacuum pump. It is another object of the present invention to provide such apparatus which is simple in operation, requires an absolute minimum of maintenance, is relatively free from malfunction, and is compact and relatively lightweight so as to be easily portable from one construction site to another.

The invention now will be described with reference to the drawings, in which:

FIGURE 1 is a perspective view of a well-point system constructed in accordance with the present invention;

FIGURE 2 is a schematic diagram of the system shown in FIGURE 1;

FIGURE 3 is a partially broken-away and partially cross-sectional view taken along line 3—3 of FIGURE 1;

FIGURE 4 is a cross-sectional view taken along line 4—4 of FIGURE 3 and

FIGURE 5 is a partially schematic diagram of a portion of the system shown in FIGURE 2, and illustrates a modified form of the invention.

FIGURE 1 shows a well-point water removal system constructed in accordance with the present invention. The system includes several well-points, each comprising a pipe 10 and an inlet screen 12 sunk into the ground 14 at spaced intervals. Each well-point is connected to a main pipe 16 on the surface of the ground. The main pipe 16 is connected to a mobile pumping unit 18 which pumps the liquid through the pipe 16 from the well-points and discharges the liquid from an outlet pipe 20. As is well known, such a well-point system can be used to dry the ground to a certain depth so as to make it easier to dig excavations in it, or to draw water from the ground for industrial or domestic use, or for other well-known uses.

The mobile pumping unit 18 includes a frame 22 mounted on wheels 24 or on skids (not shown). A motor or engine 26 drives a rotary pump 28 through a drive shaft 30. The pump 28 pumps liquid through a discharge check valve 32 and the outlet pipe 20. The pump 28 draws water through the main pipe 16 past an optional flow-smoothing manifold 34 and an optional inlet valve 36 into an inlet conduit 38 which has a slightly larger diameter than the pipe 16 connected to it.

Rotary pump 28, which preferably is of the centrifugal type, will not operate at peak efficiency if the liquid being pumped has substantial quantities of gas in it. Therefore, as is shown most clearly in FIGURE 2, a vertical separating chamber 40 is connected to the top of conduit 38 with the conduit 38 having a hole in its top communicating with the open bottom of chamber 40 so that gases will tend to rise from the liquid in the horizontal conduit 38 into the chamber 40.

In accordance with the present invention, an isolation chamber 44 is provided and connected to the top of chamber 40 by means of a gas conduit 42 of relatively large diameter. A rotary vane type of vacuum pump 48 is connected to the top of isolation chamber 44 by means of another gas conduit 46, also of relatively large diameter.

Rotary vacuum pump 48 will not operate properly if either foreign matter or water is introduced into its gas flow passages. Even the smallest particles of foreign material are likely to mar the internal components of the pump and ruin it, causing much lost time and expense in repair or replacement of the pump.

As is shown in FIGURE 2, the gas bubbles 50 rising in the separation chamber 40 often cause turbulent agitation and upward splashes 52 of the water in the tank 40. A conventional "flap" or "peel" valve 54 is provided at the opening to the outlet pipe 42 at the top of the chamber 40. Valve 54 is operated by a float 56 in order to block the exit opening of chamber 40 when the water level in the chamber rises too high. The valve opens and closes very rapidly so as to react quickly to the rapid fluctuations of liquid level in the separation chamber, and to pass as much gas and as little liquid as possible. However, the valve 54 does not prevent all of the water from splashing into the outlet pipe 42. As a result, drops of water 58, usually numerous enough to form small streams, flow almost continuously through the pipe 42 into the isolation chamber 44 where no turbulence occurs and separation is complete. Under certain conditions, the water in tank 40 will rise up to the top of the tank and great amounts of water will flow through the pipe 42 into the isolation chamber 44. Neither the small streams nor the complete overflow of water can be tolerated by the vacuum pump 48.

In accordance with the present invention, the isolation chamber prevents water from splashing into the vacuum pump. Because there is no upward movement of air through the water in chamber 44, there is no turbulence or splashing of the liquid in chamber 44. As a result, the vacuum pump 48 receives virtually no water or solids and therefore can operate for very long periods of time at or near maximum efficiency. There are no baffles in the gas flow passages to reduce the efficiency of the pump 48. In fact, the diameters of the conduits 42 and 46 can be made practically as large as necessary to permit the full flow of gas to the vacuum pump at its rated capacity, and can be made at least as large as the inlet opening to the vacuum pump 48.

A flap valve 60 and float 62 are provided as a safety feature to prevent water carry-over into the vacuum pump if the water level reaches the top of the isolation chamber 44 due to major malfunction of the system.

The removal of the accumulated liquid 64 from the isolation chamber 44 creates special problems. The chamber 44 cannot simply be opened at its bottom to let the water run out because the water is under a vacuum and will not run out. Removal of the accumulated liquid is accomplished in accordance with the present invention automatically and without the need for another pump by providing an open return conduit 66 connected at one end to the bottom of chamber 44, and at its other end 68 into the bottom of the inlet conduit 38 at which point the liquid from chamber 44 flows into the liquid in the conduit 38 from which a substantial portion of the gas has escaped. Under normal conditions, the pressure at the return conduit outlet 68 usually is somewhat greater than that in the upper part of the isolation chamber 44. For example, the vacuum (negative pressure) at the end 68 of the return conduit might be from 9 to 29 inches of mercury, and typically is around 25 inches of mercury. Typically, the vacuum at the top of chamber 44 is around 26 inches of mercury. The isolation chamber 44 is made tall enough so that the static pressure of the accumulated liquid 64 in the chamber will overcome any excess pressure at point 68 and cause the liquid 64 to discharge automatically from chamber 44 prior to the point where the level of the liquid 64 rises to the entrance of the vacuum pump feed line 46 at the top of the chamber. Thus, the accumulated liquid is removed from chamber 44 automatically and without a separate pump.

In an alternative embodiment of the invention, additional suction can be applied to the return line 66 to aid in removal of accumulated liquid from the isolation tank 44. Accordingly, another conduit 70 (see FIGURE 5) is connected at one end to the high-pressure outlet of the centrifugal water pump 28, and at the other end forms a jet nozzle 72 which extends into the return tube outlet 68 as is shown in FIGURE 5. By means of conduit 70, a high-velocity jet of liquid is forced through the tubular end 68 of the return tube 66 so as to provide continuous pumping action to aid in removing liquid 64 from the chamber 44.

Regardless of which of the above-described emptying arrangements is used, the provision of the isolating chamber 44 solves the very long-standing problem of liquid carry-over into the vacuum pump in a well-point system without occluding the gas flow passages. Since the liquid in the isolation chamber 44 is calm, water is not splashed into the vacuum feed line 46. The emptying of accumulated liquid from chamber 44 is automatic and is accomplished without the use of a separate pump. Furthermore, the automatic emptying arrangement is simple and relatively fool-proof. The exit end 68 of return line 66 is located at or near the bottom of conduit 38 so as to prevent air which accumulates near the top portion of the conduit 38 from entering the return line and causing any turbulence in the liquid 64 in isolation chamber 44. The vacuum pump 48 operates near peak efficiency because of the prevention of liquid carry-over into the pump. As a result, the centrifugal liquid pump 28 operates near peak efficiency because the gases are continuously removed from the liquid with high efficiency. This is true despite the constant violent turbulence in the separation tank 40, and even sudden inrush of great quantities of gas into the system which frequently occurs when one of the well point pipes 10 is broken. Also, since none of the liquid gets into the vacuum pump, very dirty water can be pumped without fear of damaging the vacuum pump.

As is shown in FIGURE 1, the separation chamber 40 and isolation chamber 44 are enclosed in an insulated housing 74 which is shown broken-away in FIGURE 1 to expose the chambers 40 and 44 to view. Also, an outlet pipe 76 is connected to the separation chamber 40. This pipe usually is plugged and is not used. However, it can be connected by means of a hose to a pipe 78 on the top of the smoothing manifold 34, if desired. Manifold 34 is substantially similar in operation to the separation chamber 40. It may be used, if desired, to initially remove some of the gas from the liquid and smooth the flow of the liquid before reaching the separation chamber 40.

Superficially similar ideas have been proposed for use in different types of pumping arrangements, as is shown, for example in U.S. Patents 2,275,500; 2,275,501 and 2,275,502 to Broadhurst. However, such prior art arrangements are inoperative and impractical for use in well point systems.

Now referring to FIGURES 3 and 4, the construction of the separation chamber 40 is virtually identical to that of the isolation chamber 44. Each chamber includes a vertical cylinder 82, and a top plate 84. The cylinder 82 is secured to the top plate by means of a plurality of bolts 86.

The bottom of cylinder 82 for the separating chamber 40 is welded onto an upstanding neck-portion 88 of conduit 38 which connects the bottom of chamber 40 into the conduit 38. The diameter of the chamber 40 is only slightly less than that of conduit 38, thus providing a large area for the escape of gas into the chamber 40 from the liquid. As is shown in FIGURES 2 and 4, the conduit portion 38 is of larger diameter than the pipe 16, and its centerline is located below that of pipe 16. The larger diameter of conduit 38 slows down the liquid flow, decreases its turbulence, and improves separation.

The bottom of chamber 44 is welded onto a bracket 90 which is welded onto the outside of conduit 38 so as to support the isolation chamber 44. The return conduit 66, which is either a metal pipe or a hose, is connected between a hole in the bottom of chamber 44 and the pipe 66 by means of a conventional elbow fitting 92. Fitting 68 also is a conventional elbow fitting which is positioned at the bottom of conduit 16 so as to prevent air from flowing up into the return line 66. The outlet of fitting 68 opens towards the centrifugal pump 28 and thus tends to gain the benefit of slight suction at its opening produced by the liquid flow past it.

FIGURE 4 shows the optional ejector emptying arrangement which also is shown in FIGURE 2. A T-shaped pipe fitting 80 is fastened to the end of return conduit 66. The jetting tip 72 is fitted into one end of the T-fitting, The conduit 70 passes through the bottom of the pipe 16 and is connected to the high-pressure outlet of the pump 28.

Referring again to FIGURE 3, the top plate 84 of each chamber 40 and 44 has a grid formed by a number of holes 94 in its center. These holes serve as the gas outlet openings for each chamber and are made as large as possible while still providing a seat for the flaps of the valves 54 and 60. Conventional pipe fittings 96, 98 and 100 are provided to connect the holes 94 of chamber 44 to the vacuum pump inlet conduit 46. Furthermore, conventional fittings 102, 104, 106 and 108 are used to connect the conduit 42 between the holes 94 in separation chamber 40 and the inlet opening 110 in chamber 44. The latter opening is located about one-third of the way down from the top of chamber 44.

The valves 54 and 60 and floats 56 and 62 are identical in both chambers. The construction of each is well-known. Each valve includes a flexible flap portion 112 and a relatively stiff resilient member 114 which tends to press the flap 112 upwardly to close the holes 94. The floats 56 and 62 are joined to the flaps 112 by means of a pair of rubber rings 116 and 118. As is well known, as each ball 56 or 62 rises, the flap 112 moves upwardly to close the openings 94. When the ball drops, the flap 112 is "peeled" away from its valve seat, the valve thus being relatively easy to open. The "peel" valves provide protection only against the flow of relatively large amounts of liquid out of the respective gas outlets of the chambers 40 and 44. However, they do not excessively constrict the flow of air from the chambers because they have openings large enough to easily pass the full flow of gases to the vacuum pump, and because they open so quickly.

The vacuum pump 48 preferably is lubricated by recirculating oil. The oil is circulated through a heat exchanger which uses clean water, preferably water which is being pumped in the pumping unit 18, to cool the oil as it flows through the heat exchanger. By this means, the temperature of the vacuum pump is maintained at a safe level, for example, from around 150° to around 180° F.

The above description of the invention is intended to be illustrative and not limiting. Various changes or modifications in the embodiments described may occur to those skilled in the art and these can be made without departing from the spirit or scope of the invention as set forth in the claims.

I claim:

1. A system for removing dispersed water from the ground, said system comprising, in combination, a plurality of pipes located in the ground at separate locations, each of said pipes having at least one liquid inlet opening adjacent its lower end, a liquid pump for producing sub-atmospheric liquid pumping pressures for lifting water out of the ground, main conduit means connecting said pipes to said liquid pump, a separation chamber connected to said main conduit means for receiving gas separated from said liquid before it reaches said liquid pump, a second chamber connected to said separation chamber to receive gas therefrom, a gas vacuum pump connected to said second chamber to remove gas therefrom, normally substantially unrestricted gas conduit means for conducting gas from said separation chamber into said second chamber and from said second chamber to said vacuum pump, return conduit means connecting said second chamber to said main conduit means to automatically return separated liquid from said second chamber to said main conduit means, the discharge end of said return conduit means forming an elongated tubular protrusion into said main conduit means, and a jetting conduit connected at one end to the high-pressure side of said liquid pump and having a jet tip at its other end projecting into said discharge end of said return conduit to form a discharge pump arrangement.

2. A method of separating gases from water in a system for removing dispersed ground water from the ground through a plurality of pipes sunk into the ground at spaced intervals, said method comprising flowing said water through said pipes by a sub-ambient pressure-producing liquid pump connected therewith through a main conduit, said system including two series-connected gas separation chambers, the first of said chambers being connected to said main conduit, pumping gas from the second of said chambers at a pressure lower than that of the pressure on the water at the point of connection of said first chamber to said main conduit by a vacuum pump connected to the second of said chambers, returning water through a return conduit connected between said second chamber and said main conduit, and maintaining the connection of said vacuum pump to said second chamber at an elevation higher than the connection of said return conduit to said main conduit by a distance such that the static pressure created on said return conduit by the liquid filling said second chamber to the vacuum connection point will be greater than any excess of pressure in said main conduit at said return conduit connection thereto over the gas pressure at said vacuum connection point.

3. A method as in claim 2 in which said chambers are aligned substantially vertically and in side-by-side relationship to one another, and including maintaining said chambers above the connection of said return conduit to said main conduit.

4. A method as in claim 2 in which liquid flows through said main conduit substantially horizontally, and in which liquid from said second chamber is returned to the liquid flowing in said main conduit adjacent the bottom of said main conduit.

References Cited

UNITED STATES PATENTS

| | | | |
|---|---|---|---|
| 1,887,918 | 11/1932 | Brouse | 55—166 |
| 2,748,885 | 6/1956 | Day et al. | 55—165 |
| 2,768,704 | 10/1956 | Cronkhite | 55—168 X |
| 3,050,008 | 8/1962 | Pacey et al. | 55—168 X |

REUBEN FRIEDMAN, *Primary Examiner.*

R. W. BURKS, *Assistant Examiner.*

U.S. Cl. X.R.

55—55, 170, 189